(12) United States Patent
Hirata et al.

(10) Patent No.: US 10,459,532 B2
(45) Date of Patent: Oct. 29, 2019

(54) CURSOR MOVEMENT CONTROL METHOD, COMPUTER PROGRAM, CURSOR MOVEMENT CONTROL DEVICE AND IMAGE DISPLAY SYSTEM

(71) Applicant: EIZO Corporation, Hakusan, Ishikawa (JP)

(72) Inventors: Naoaki Hirata, Ishikawa (JP); Ikumi Arai, Ishikawa (JP)

(73) Assignee: EIZO CORPORATION, Hakusan-Shi, Ishikawa (JP)

( * ) Notice: Subject to any disclaimer, the term of this patent is extended or adjusted under 35 U.S.C. 154(b) by 0 days.

(21) Appl. No.: 14/391,275

(22) PCT Filed: Dec. 20, 2012

(86) PCT No.: PCT/JP2012/082990
§ 371 (c)(1),
(2) Date: Oct. 8, 2014

(87) PCT Pub. No.: WO2013/153707
PCT Pub. Date: Oct. 17, 2013

(65) Prior Publication Data
US 2015/0084863 A1  Mar. 26, 2015

(30) Foreign Application Priority Data

Apr. 11, 2012  (JP) .................. 2012-090503

(51) Int. Cl.
*G06F 3/033* (2013.01)
*G09G 5/14* (2006.01)
*G06F 3/0481* (2013.01)

(52) U.S. Cl.
CPC .......... *G06F 3/033* (2013.01); *G06F 3/04812* (2013.01); *G09G 5/14* (2013.01)

(58) Field of Classification Search
CPC ............... G06F 3/033; G06F 2203/015; G06F 345/156; G06F 3/011; G06F 3/012;
(Continued)

(56) References Cited

U.S. PATENT DOCUMENTS 5,414,471 A   5/1995  Saitoh et al.
5,452,012 A   9/1995  Saitoh
(Continued)

FOREIGN PATENT DOCUMENTS

CN    1364252    8/2002
CN    1734414    2/2006
(Continued)

OTHER PUBLICATIONS

European Search Report dated Dec. 10, 2015 for related EP Application No. 12874208.7, 12 pages.
(Continued)

*Primary Examiner* — Grant Sitta
(74) *Attorney, Agent, or Firm* — Andrew M. Calderon; Roberts Mlotkowski Safran Cole & Calderon, P.C.

(57) ABSTRACT

A problem is to provide a cursor movement control method by which labor necessary for a movement of a cursor can be reduced and convenience of a user can be improved even when a plurality of screens is displayed on one display device, a computer program, a cursor movement control device, and an image display system. A technical solution is such that a display image creation unit (13) sets a region in a display image corresponding to a display region A to a region a and a region in the display image corresponding to a display region B to a region b, and allocates the regions a and b into the display image. An input unit (12) receives an instruction for whether or not to superposedly display the display region B on the display region A on the display screen (54). A cursor movement control unit (15) controls
(Continued)

the movement of the cursor between the region a and the region b according to the received instruction for a superposed display.

20 Claims, 12 Drawing Sheets

(58) Field of Classification Search
CPC .......... G06F 3/013; G06F 3/014; G06F 3/016; G06F 3/0416; G06F 3/0418; G06F 3/03; G06F 3/0338; G06F 3/0334; G06F 3/0354; G06F 3/03541; G06F 3/03543; G06F 3/03544; G06F 3/03545; G06F 3/04812; G09G 5/14
USPC .......................................... 345/1.1, 156–157
See application file for complete search history.

(56) References Cited

U.S. PATENT DOCUMENTS

| | | | |
|---|---|---|---|
| 5,657,050 A | 8/1997 | McCambrige et al. | |
| 5,726,681 A | 3/1998 | Kanamori | |
| 5,796,402 A * | 8/1998 | Ellison-Taylor | G09G 5/14 715/792 |
| 5,867,227 A * | 2/1999 | Yamaguchi | H04N 5/45 725/56 |
| 5,999,191 A * | 12/1999 | Frank | G06F 3/0481 345/634 |
| 6,204,887 B1 * | 3/2001 | Hiroi | G09G 5/14 348/565 |
| 6,297,804 B1 | 10/2001 | Kashitani | |
| 6,313,880 B1 * | 11/2001 | Smyers | H04L 12/40117 348/552 |
| 6,556,252 B1 * | 4/2003 | Kim | H04N 5/45 348/521 |
| 7,119,849 B2 * | 10/2006 | Yui | G06F 3/14 348/564 |
| 7,265,695 B2 * | 9/2007 | Kamimura | G09G 5/006 341/120 |
| 7,268,830 B2 * | 9/2007 | Lee | G06F 3/0481 348/565 |
| 7,369,099 B2 | 5/2008 | Arai et al. | |
| 7,692,725 B2 * | 4/2010 | Hirotani | H04N 5/44591 348/556 |
| 7,782,340 B2 * | 8/2010 | Huang | G06F 3/14 345/629 |
| 7,868,881 B2 * | 1/2011 | Matsubara | G06F 3/14 345/204 |
| 8,497,819 B2 * | 7/2013 | Hoppenbrouwers | G09G 3/3225 313/463 |
| 9,817,484 B2 * | 11/2017 | Geng | G06F 3/023 |
| 2002/0087761 A1 * | 7/2002 | Clapp | H04M 3/56 710/65 |
| 2002/0126088 A1 | 9/2002 | Abdelhadi et al. | |
| 2002/0196367 A1 * | 12/2002 | Yui | H04N 5/45 348/565 |
| 2002/0196369 A1 * | 12/2002 | Rieder | G09G 5/00 348/584 |
| 2003/0001966 A1 * | 1/2003 | Matsubara | G06F 3/14 348/553 |
| 2003/0058262 A1 * | 3/2003 | Sato | G06F 3/147 345/690 |
| 2003/0222856 A1 * | 12/2003 | Fedorak | G06F 1/1626 345/173 |
| 2004/0201780 A1 * | 10/2004 | Kim | H04N 5/45 348/565 |
| 2004/0236874 A1 * | 11/2004 | Largman | G06F 21/53 710/8 |
| 2005/0125328 A1 * | 6/2005 | Schluetter | G06F 3/04812 705/37 |
| 2006/0044328 A1 * | 3/2006 | Rai | G09G 5/397 345/629 |
| 2006/0136828 A1 * | 6/2006 | Asano | G06F 3/1454 715/733 |
| 2007/0008338 A1 * | 1/2007 | Kim | G09G 5/003 345/629 |
| 2007/0109287 A1 | 5/2007 | Matsubara et al. | |
| 2007/0216656 A1 * | 9/2007 | Chen | G06F 3/041 345/173 |
| 2010/0053428 A1 | 3/2010 | Ohe et al. | |
| 2010/0271377 A1 * | 10/2010 | Low | G09G 3/344 345/531 |
| 2011/0022990 A1 * | 1/2011 | Wu | G06F 3/04883 715/856 |
| 2011/0310123 A1 * | 12/2011 | Matsubara | H04N 5/44582 345/634 |
| 2013/0063374 A1 * | 3/2013 | Lee | G06F 3/038 345/173 |
| 2014/0285437 A1 * | 9/2014 | Lu | G06F 3/038 345/163 |

FOREIGN PATENT DOCUMENTS

| | | |
|---|---|---|
| CN | 101543068 | 9/2009 |
| JP | 63253397 A | 10/1988 |
| JP | AS64080993 | 3/1989 |
| JP | 10187352 A | 7/1998 |
| JP | 2000099238 A | 4/2000 |
| JP | A2000148350 | 5/2000 |
| RU | 2275674 | 4/2006 |

OTHER PUBLICATIONS

Australian Office Action dated Jun. 12, 2015 for related AU Application No. 2012376936, 3 pages.
European Search Report dated Sep. 2, 2015 for related EP Application No. 12874208.7, 5 pages.
Russian Office Action dated Dec. 29, 2015 for related RU Application No. 2014145230/08 (016663), 14 pages.
European Office Action in EP Application No. 12874208.7 dated Aug. 9, 2017, 4 pages.
Chinese Office Action in CN Application No. 201280072347.6 dated Jul. 24, 2017, 24 pages.
Chinese Office Action dated Nov. 3, 2016 for related CN Application No. 2012800722347.6, 21 pages.
Chinese Office Action in CN Application No. 201280072347.6 dated Feb. 1, 2018, 31 pages.
EP Examination Report in EP Application No. 12 874 208.7-1210 dated Apr. 10, 2018, 4 pages.
Chinese Office Action in CN Application No. 201280072347.6 dated Dec. 10, 2018, 32 pages.
Chinese Office Action in CN Application No. 201280072347.6 dated Aug. 31, 2018, 36 pages.
Indian Office Action in Application No. 7492/CHENP/2014 dated Mar. 28, 2019, 7 pages.

* cited by examiner

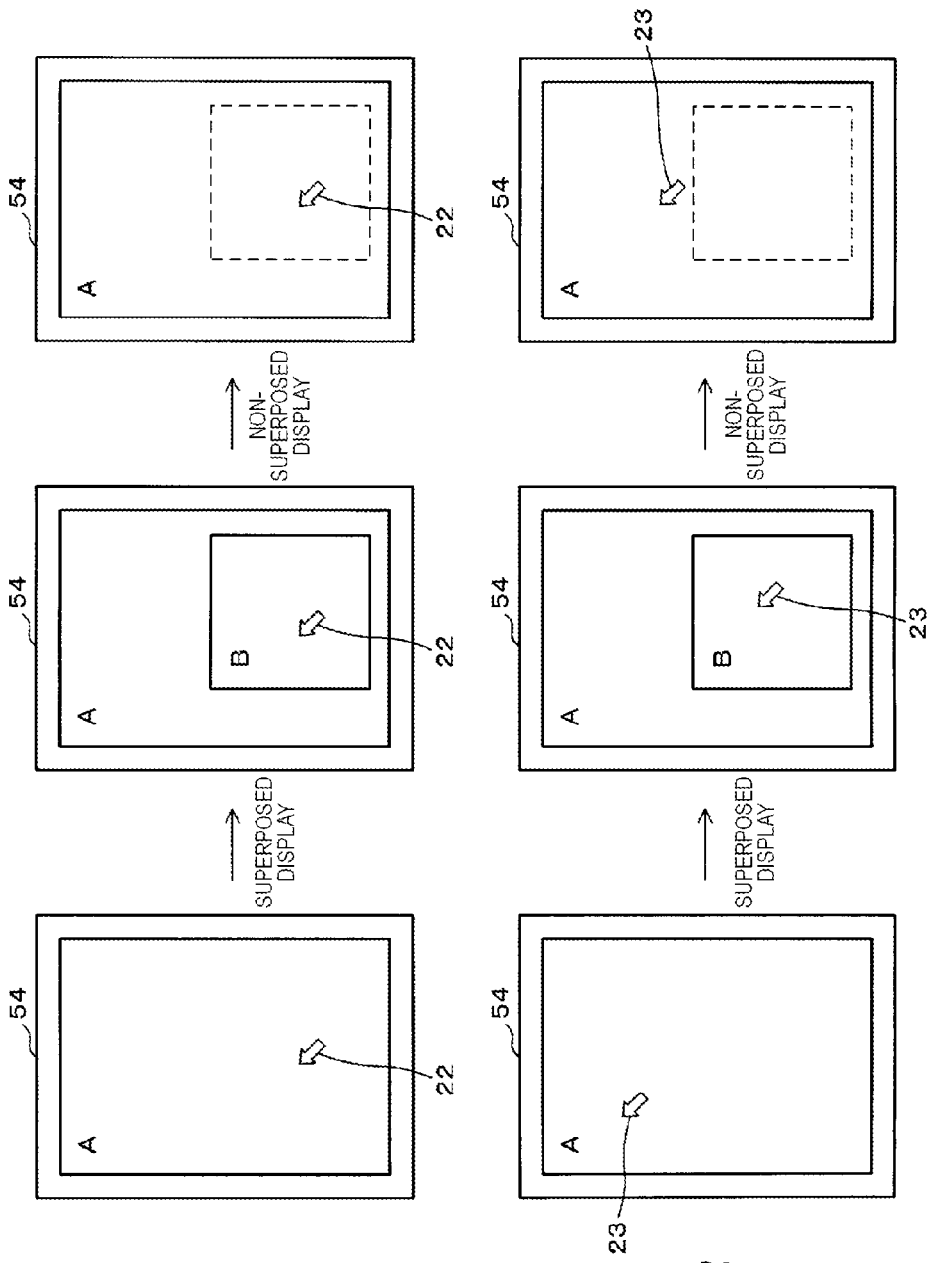

RELATED ART

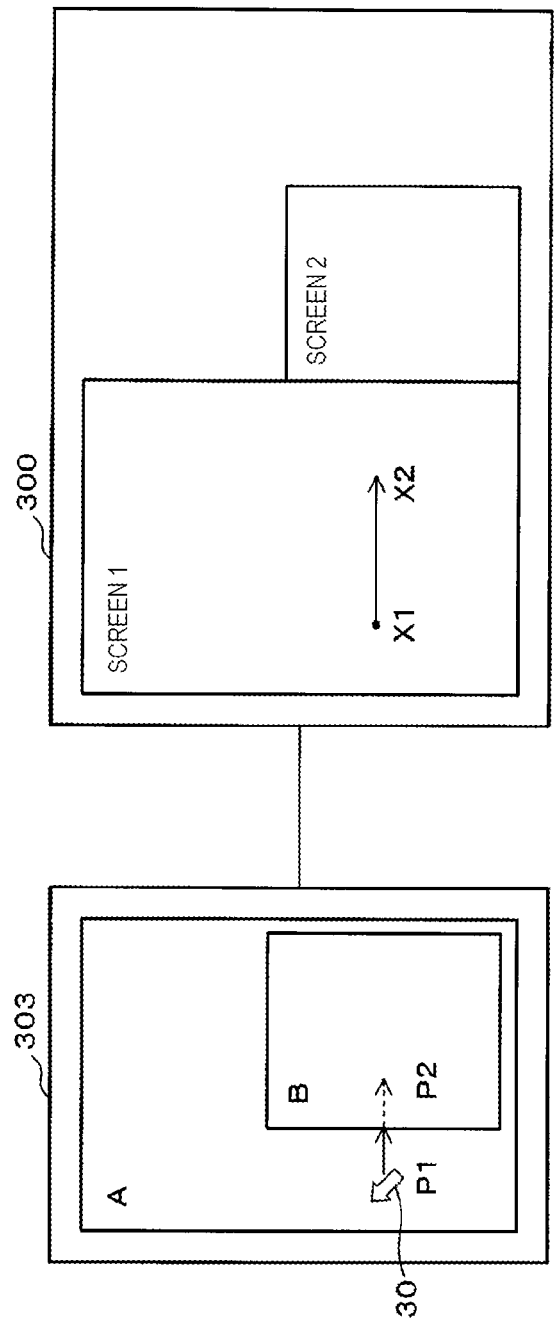

CURSOR MOVEMENT CONTROL METHOD, COMPUTER PROGRAM, CURSOR MOVEMENT CONTROL DEVICE AND IMAGE DISPLAY SYSTEM

TECHNICAL FIELD

The present invention relates to a cursor movement control method for displaying a plurality of screens to be respectively displayed on a plurality of display devices on one display device and for moving a cursor between the plurality of screens, to a computer program for realizing the cursor movement control method, to a cursor movement control device, and to an image display system.

BACKGROUND ART

In the related art, in a radiogram interpretation room of a medical institution such as a medical center, a monitor (a display device) with a high resolution and a monitor with a low resolution are installed, and the respective monitors are connected to one image creation device by a multi-monitor connection. In addition an image such as a roentgen or a CT scan is displayed on the high resolution monitor by a multi-monitor function, and a manipulation image (a console image) for manipulating the image is displayed on the low resolution monitor.

FIG. 12 is a schematic view illustrating an example of a configuration of an image display system of the related art. As illustrated in FIG. 12, two display devices 301 and 302 are connected (so called multi-monitor connection) to an image forming apparatus 300. One display device 301 includes a high resolution display region A, and the other display device 302 includes a low resolution display region B (for example, refer to Patent Literature 1).

CITATION LIST

Patent Literature

Patent Literature 1: JP-A-2000-99238

SUMMARY OF INVENTION

Technical Problem

It takes the labor of a user to install a plurality of display devices, or to have a maintenance on the display devices, and thus there is a demand for displaying two screens on one display device. In Patent Literature 1, a screen switching technology in which images of two screens are input to one display device and determination of which image to be displayed is controlled by a movement of a cursor is disclosed. However, only either of the screens is displayed on the display device, and thus both images may not be simultaneously viewed.

FIG. 13 is a schematic view illustrating an example of the image display system having a PinP display function of displaying a multi-monitor display of the related art. The PinP display indicates a picture-in-picture display. As illustrated in FIG. 13, the other display region B is superposedly displayed on one display region A on a display device 303, and thus it is possible to display a plurality of screens on one display device. However, an operating system (OS) provided in the image creation device 300 recognizes that two screen 1 and screen 2 (also referred to as a display image) corresponding to two display regions are arranged to be adjacent to each other. Therefore, as illustrated in FIG. 13, when a cursor (or a pointer of a mouse) 30 is moved to a position P2 of the display region B from a position P1 of the display region A in a state where the display region B is superposedly displayed on the display region A on the display device 303, the OS recognizes that a cursor is moved to a position X2 from a position X1 on the screen 1. For this reason, the cursor 30 displayed on the screen of the display device 303 is not viewed when the cursor 30 enters the display region B, and a movement of the cursor which is unintended by the user may occur. In FIG. 13, in order to display the cursor on a screen B, it is necessary to move the cursor to the outside of a screen A, and thus manipulability may be degraded.

The present invention is made in consideration of such a situation, and is to provide a cursor movement control method by which the labor necessary for a movement of a cursor could be reduced and convenience of a user could be improved even when a plurality of screens is displayed on one display device, a computer program for realizing the cursor movement control method, a cursor movement control device, and an image display system.

Solution to Problem

A cursor movement control method according to a first aspect of the present invention is a cursor movement control method performed by a cursor movement control device which controls a movement of a cursor position in a display image including a plurality of regions to be allocated into a plurality of display regions displayed on a display screen of an image display device, the cursor movement control method including: a reception step of receiving an instruction for a display or a non-display of another display region simultaneously displayed with one display region on the display screen; and a control step of controlling the movement of the cursor position between one region corresponding to the one display region and another region corresponding to the other display region according to the instruction received in the reception step.

The cursor movement control method according to a second aspect of the present invention is such that in the first aspect, in the control step, the cursor position on the one region is moved onto the other region when the instruction for the display is received in the reception step.

The cursor movement control method according to a third aspect of the present invention is such that in the second aspect, in the control step, the cursor position is moved onto the other region such that a position of a cursor on the display screen is not changed when the cursor on the one display region is in a superposed position on the other display region.

The cursor movement control method according to a fourth aspect of the present invention is such that in any one of the first aspect to the third aspect, in the control step, the cursor position on the other region is moved onto the one region when the instruction for the non-display is received in the reception step while the one display region and the other display region are simultaneously displayed on the display screen.

The cursor movement control method according to a fifth aspect of the present invention is such that in the fourth aspect, in the control step, the cursor position is moved onto the one region such that the position of the cursor on the display screen is not changed.

A cursor movement control method according to a sixth aspect of the present invention is a cursor movement control method performed by a cursor movement control device which controls a movement of a cursor position in a display image including a plurality of regions to be allocated into a plurality of display regions displayed on a display screen of an image display device, the cursor movement control method including: a specification step of specifying, in the display image, boundary information indicating as boundary between one display region and the other display region for a case where the one display region and the other display region are simultaneously displayed on the display screen; a reception step of receiving a movement manipulation of a cursor; a determination step of determining whether or not the cursor position according to the movement manipulation received in the reception step exceeds the boundary; a creation step of creating movement information of the cursor position between the one region and the other region based on position information of the cursor position when it is determined that the cursor position exceeds the boundary in the determination step; and a control step of controlling the movement of the cursor position between the one region and the other region based on the movement information created in the creation step.

The cursor movement control device according to a seventh aspect of the present invention is such that in the sixth aspect, the device further includes: an acquisition step of acquiring arrangement information of the other display region simultaneously displayed with the one display region from the image display device, wherein in the creation step, the movement information of the cursor position is created based on the arrangement information acquired in the acquisition step and the position information of the cursor position.

A computer program according to an eighth aspect of the present invention is a computer program for causing a computer to control a movement, of a cursor position in a display image including a plurality of regions to be allocated into a plurality of display regions displayed on a display screen of an image display device, the computer program causing the computer to execute: a reception step of receiving an instruction for a display or a non-display of another display region simultaneously displayed with one display region on the display screen; and a control step of controlling the movement of the cursor position between one region in the display region corresponding to the one display region and another region in the display region corresponding to the other display region according to the received instruction.

A computer program according to a ninth aspect of the present invention is a computer program for causing a computer to control a movement of a cursor position in a display image including a plurality of regions to be allocated into a plurality of display regions displayed on a display screen of an image display device, the computer program causing the computer to execute: a specification step of specifying, in the display image, boundary information indicating a boundary between one display region and the other display region for a case where the one display region and the Other display region are simultaneously displayed on the display screen; a reception step of receiving a movement manipulation of a cursor; a determination step of determining whether or not the cursor position according to the received movement manipulation exceeds the boundary; a creation step of creating movement information of the cursor position between one region in the display region corresponding to the one display region and another region in the display region corresponding to the other display region based on position information of the cursor position when it is determined that the cursor position exceeds the boundary; and a control step of controlling the movement of the cursor position between the one region and the other region based on the created movement information.

A cursor movement control device according to a tenth aspect of the present invention is a cursor movement control device which controls a movement of a cursor position in a display image including a plurality of regions to be allocated into a plurality of display regions displayed on a display screen of an image display device, the cursor movement control device including: instruction reception means for receiving an instruction for a display or a non-display of another display region simultaneously displayed with one display region on the display screen; and movement control means for controlling the movement of the cursor position between one region corresponding to the one display region and another region corresponding to the other display region according to the instruction received in the reception means.

A cursor movement control device according to an eleventh aspect of the present invention is a cursor movement control device which controls a movement of a cursor position in a display image including a plurality of regions to it allocated into a plurality of display regions displayed on a display screen of an image display device, the cursor movement control device including: specification means for specifying, in the display image, boundary information indicating a boundary between one display region and the other display region when the one display region and the other display region are simultaneously displayed on the display screen; manipulation reception means for receiving a movement, manipulation of a cursor; determination means for determining whether or not the cursor position according to the movement manipulation received in the reception means exceeds the boundary; creation means for creating movement information of the cursor position between the one region and the other region based on position information of the cursor position when it is determined that the cursor position exceeds the boundary in the determination means; and movement control means for controlling the movement of the cursor position between the one region and the other region based on the movement information created in the creation means.

An image display system according to a twelfth aspect of the present invention includes: the cursor movement control device according to the tenth or the eleventh aspect of the present invention; and an image display device including a display screen on which a cursor is displayed by the cursor movement control device.

According to the first, the eighth, and the tenth aspects of the present invention, the movement of the cursor position is controlled in the display image including the plurality of regions which is allocated into the plurality of display regions displayed on the display screen. For example, it is assumed that the plurality of display regions are set to display regions A and B, and that, in the display image, a region corresponding to the display region A is set to a region a (a display image region), and a region corresponding to the display region B is set to a region b (a display image region). The regions a and b, for example, are arranged to be adjacent to each other in the display image. The instruction reception means receives an instruction for whether or not to simultaneously display one display region and the other display region. The instruction reception means receives an instruction for a simultaneous display or a non-simultaneous display. The movement control means controls the movement of the cursor position between one region corresponding to the one display region and the other region corresponding to the other display region according to the received instruction. The cursor, for example, points to charts, signs, symbols, or the like for indicating a target which is manipulated on the display screen, and is a pointer of a pointing device such as a mouse or a touch pad, or the like. In addition, the cursor position is a cursor position in a work region of a memory.

For example, when the instruction for the simultaneous (for example, superposed) display of the display region A and the display region B is received, the cursor position existing in the region a (the display image region) corresponding to the display region A is moved to the region b (the display image region) corresponding to the display region B. In addition, when the display region A and the display region B are simultaneously displayed, the cursor position existing in the region b (the display image region) corresponding to the display region B is moved to the region a (the display image region) corresponding to the display region A at the time of receiving the instruction for the non-simultaneous display. Accordingly, when a so-called PinP function is realized, that is, when a plurality of screens is displayed on one display device, it is not necessary for a used to move the cursor between the display regions, and thus it is possible to improve the convenience of the user.

According to the second aspect of the present invention, when the instruction for the simultaneous display of the one display region and the other display region is received, the cursor position on the one region is moved onto the other region. That is, when the instruction for the simultaneous display of the display region A and the display region B is received, the cursor position existing in the region a (the display image region) corresponding to the display region A is moved to the region b (the display image region) corresponding to the display region B. The movement of the cursor position may be in any position in the region b corresponding to the display region B, and for example, in the center of the region b, or when the cursor on the display region A is in a position superposed on the display region B, the cursor may be displayed on the display region B without changing the position of the cursor. Accordingly, for example, whenever the simultaneous display is performed, the user is able to save the labor of moving the cursor to the outside of the display region A to display the cursor on the display region B, and thus it is possible to improve the convenience of the user.

According to the third aspect of the present invention, when the cursor on the one display region is in a position superposed on the other display region, the cursor position is moved onto the other region such that the position of the cursor on the display screen is not changed. That is, when the display region A and the display region B are simultaneously displayed, the cursor is displayed on the display region B without changing the position of the cursor at the time that the cursor on the display region A is in a position from which the display region B disappears. Accordingly, for example, whenever the simultaneous display is performed, the user is able to save the labor of moving the cursor to the outside of the display region A to display the cursor on the display region B, and thus it is possible to improve the convenience of the user.

According to the fourth aspect of the present invention, when the one display region and the other display region are simultaneously displayed on the display screen, the cursor position on the other region is moved onto the one region corresponding to the one display region at the time of receiving the instruction for the non-display of the other display region. That is, when the display region A and the display region B are simultaneously displayed, the cursor position existing in the region b (the display image region) corresponding to the display region B is moved to the region a (the display image region) corresponding to the display region A at the time of receiving the instruction for the non-simultaneous display. The movement of the cursor position may be in any position in the region a corresponding to the display region A, and for example, in the center of the region a, or the cursor may be displayed on the display region A without changing the position of the cursor. Accordingly, for example, whenever the non-simultaneous display is performed, the user is able to save the labor of moving the cursor to the outside of the display region B to display the cursor on the display region A, and thus it is possible to improve the convenience of the user.

According to the fifth aspect of the present invention, the cursor position is moved onto the one region such that the position of the cursor on the display screen is not changed. That is, when the non-simultaneous display is performed while the display region A and the display region B are simultaneously displayed, the cursor is displayed on the display region A without changing the position of the cursor on the display region B. Accordingly, for example, whenever the non-simultaneous display is performed, the user is able to save the labor of moving the cursor to the outside of the display region B to display the cursor on the display region A, and thus it is possible to improve the convenience of the user.

According to the sixth, the ninth, and the eleventh aspects of the present invention, the movement of the cursor position is controlled in the display image including the plurality of regions which is allocated into the plurality of display regions displayed on the display screen. For example, it is assumed that the plurality of display regions are set to display regions A and B, and that, in the display image, a region corresponding to the display region A is set to a region a (a display image region), and a region corresponding to the display region B is set to a region b (a display image region). The regions a and b, for example, are arranged to be adjacent to each other in the display image. The specification means specifies the boundary information indicating a boundary between the display regions at the time of simultaneously displaying the one display region and the other display region in the display image. When the display region A and the display region B are simultaneously displayed on the screen, the boundary information can be indicated by horizontal and vertical line segments for defining the display region B on the region a at the time of simultaneously displaying the display region B on the region a corresponding to the display region A similar to the display screen.

When the movement manipulation of the cursor is received, the determination means determines whether or not the cursor position which is moved according to the movement manipulation exceeds the boundary. For example, the determination means determines whether or not the cursor position in the region a is moved to exceed the boundary with the display region B. Otherwise, the determination means determines whether or not the cursor position in the display region B is moved to exceed the boundary with the region a. When it is determined that the cursor position exceeds the boundary, the creation means creates the movement information of the cursor position between the one region and the other region based on the position information of the cursor position. For example, when the cursor position in the region a is moved to exceed the boundary with the display region B, the movement information for moving the cursor position from the position in the region a to the position in the region b corresponding to the display region B is created. In addition, when the cursor in the region b is moved to exceed the boundary with the display region A, the movement information for moving the cursor position from the position in the region b to the position in the region a corresponding to the display region A is created. When the position in the work region is indicated by coordinates (X, Y), the movement information, for example, can be indicated by a movement distance on the x coordinate, and by a movement distance on the y coordinate distance.

The movement control means moves the cursor position between the region a corresponding to the display region A and the region b corresponding to the display region B based on the created movement information. Accordingly, when the so-called PinP function is realized, that is when a plurality of screens is displayed on one display device, the cursor can be smoothly moved between the display regions simultaneously displayed on the display screen (a seamless movement can be realized), and thus it is possible to prevent a problem in which the movement of the cursor which is unintended by the user occurs such as a phenomenon where the cursor disappears from the boundary between the simultaneously displayed display regions, or a phenomenon where the cursor suddenly appears from an end of the display region.

According to the seventh aspect of the present invention, the arrangement information of the other display region simultaneously displayed with the one display region is acquired from the image display device. When the one display region and the other display region are simultaneously displayed on the display screen, the image display device retains the arrangement information on how the other display region is superposed. The arrangement information, for example, is information indicating where an origin of the other display region is in the position or the coordinates of the one display region with respect to the position or the coordinates (0, 0) of the origin (for example, the left upper end of the display region) of the one display region, and for example, can be indicated by the coordinates (Xs, Ys). The creation means creates the movement information of the cursor based on the acquired arrangement information and the position information of the cursor. For example, when the one display region A and the other display region B are simultaneously displayed, the horizontal size and the vertical size of the region a corresponding to the display region A are set to v1 and v2, respectively, and the horizontal size and the vertical size of the display region B are set to w1 and w2, respectively. In addition, when the position or the coordinates of the cursor in the region a (the display image region) corresponding to the display region A are set to (Xm, Ym), the position or the coordinates of the cursor in the display image region at the time that the cursor exceeds the boundary of the region a corresponding to the display region A to be moved to the display region B are able to be indicated by (Xp+v2, Yp+v1−w1). Here, Xp=Xm−Xs, and Yp=Ym−Ys. Accordingly, when the so-called PinP function is realized, that is when a plurality of screens is displayed on one display device, the cursor can be smoothly moved between the display regions simultaneously displayed on the display screen (the seamless movement can be realized), and thus it is possible to prevent the problem in which the movement of the cursor which is unintended by the user occurs such as the phenomenon where the cursor disappears from the boundary between the simultaneously displayed display regions, or the phenomenon where the cursor suddenly appears from the end of the display region.

Advantageous Effects of Invention

According to the present invention, it is not necessary for the user to move the cursor between the display regions, and thus it is possible to improve the convenience of the user.

BRIEF DESCRIPTION OF DRAWINGS

FIGS. 6A and 6B are schematic views illustrating an example of a movement of the cursor by the image creation device according to Embodiment 1.

FIG. 13 is a schematic view illustrating an example of the image display system having a PinP display function of displaying a multi-monitor display of the related art.

DESCRIPTION OF EMBODIMENTS

Embodiment 1

Figure 1:
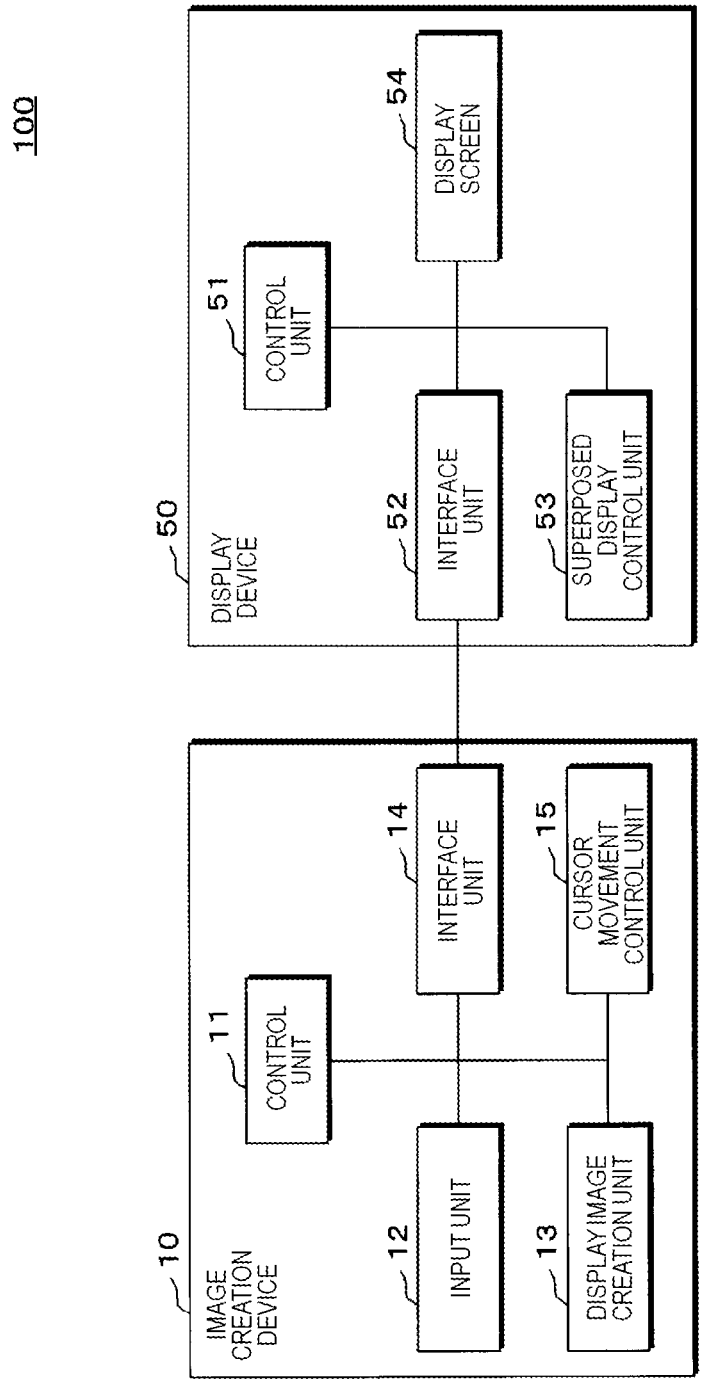
FIG. 1 is a block diagram illustrating an example of a configuration of an image display system according to Embodiment 1.

Hereinafter, a cursor movement control device, an image display system, a computer program, and an image process method according to the present invention will be described with reference to the drawings illustrating embodiments. FIG. 1 is a block diagram illustrating an example of a configuration of an image display system 100 according to Embodiment 1. The image display system 100 includes an image creation device 10 as a cursor movement control device, a display device 50 as an image display device, and the like. Image data created by the image creation device 10 or image data fetched from an external device by the image creation device 10 are output to the display device 50, and thus the display device 50 displays an image.

The image creation device 10 includes a control unit 11 for controlling the entire device, an input unit 12, a display image creation unit 13, an interface unit 14, a cursor movement control unit 15, and the like.

The display device 50 includes a control unit 51 for controlling the entire device, an interface unit 52, a superposed display control unit 53, a display screen 54, and the like.

The image creation device 10 and the display device 50 can transmit and receive information such as image data, and a command through the interface units 14 and 52, respectively.

The input unit 12, for example, is configured by a pointing device such as a mouse or a touch pad, or the like. Since a user indicates a manipulation target on the display screen 54 while viewing a cursor displayed on the display screen 54, the input unit 12 has a function as manipulation reception means which receives a movement manipulation of the cursor. The cursor, for example, points to charts, signs, symbols, or the like for indicating the target which is manipulated on the display screen 54.

In addition, the input unit 12 has a function as instruction reception means which receives an instruction for whether or not to simultaneously display one display region and another display region on the display screen 54. That is, the user, for example, manipulates a button, an icon, or the like for a simultaneous display which is displayed on the display screen 54, and thus it is possible to perform switching of a so-called picture-in-picture (PinP) function between activation and inactivation. When the PinP function is activated, the simultaneous display is performed, and when the PinP function is inactivated, a non-simultaneous display is performed. The input unit 12 may be used in a switch disposed in the display device 50. In the following description, the simultaneous display, for example, includes a so-called picture-by-picture (PbyP) display in which two or more display regions are displayed in parallel with each other without being superposed as well as a display in which the display regions are displayed by superposing the other display region onto the one display region. Hereinafter, a superposed display will be described as the simultaneous display.

The control unit 51 of the display device 50 has a function as display control means, and when the instruction for the superposed display is received, the control unit 51 controls the superposed display control unit 53 to superposedly display the other display region B on one display region A displayed on the display screen 54 of the display device 50. In addition, when the instruction for the non-superposed display is received, the control unit 51 controls the superposed display control unit 53 not to display the display region B which has been superposedly displayed on the display screen 54 of the display device 50. The instruction from the input unit 12 is transmitted to the display device 50 from the image creation device 10 through the interface units 14 and 52. When the input unit 12 is disposed in the display device 50, the instruction is directly transmitted to the control unit 51, and is transmitted to the image creation device 10 from the display device 50 through the interface units 14 and 52.

Figure 2:
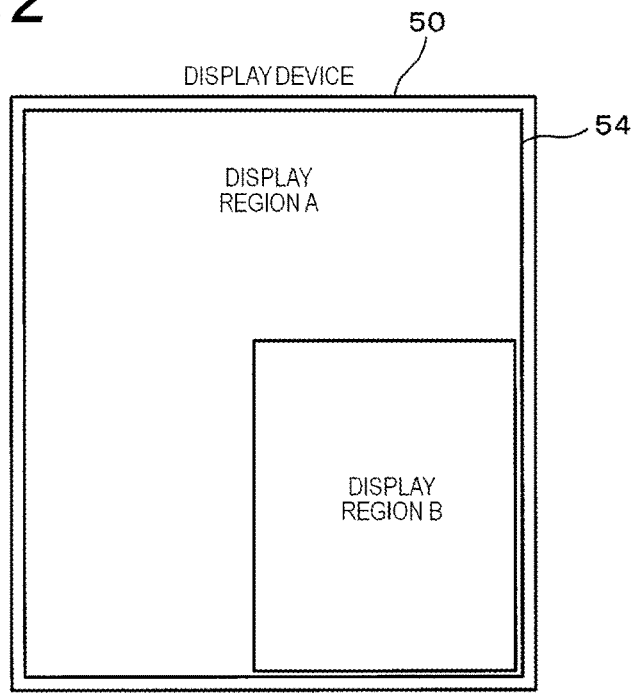
FIG. 2 is a schematic view illustrating an example of a display screen when a PinP function is activated.

FIG. 2 is a schematic view illustrating an example of the display screen 54 when the PinP function is activated. As illustrated in FIG. 2, on the display screen 54 of the display device 50, the other display region B is superposed on the one display region A. In the display region A, for example, a high resolution image such as a roentgen or a CT scan can be displayed, and in the display region B, a relatively low resolution manipulation image (a console image) can be displayed. A position of the display region B with respect to the display region A is an example, and the position is not limited to the example of FIG. 2. In addition, in the example of FIG. 2, an aspect in which one display region B is superposed is illustrated, but two or more display regions may be superposed. When the PinP function is inactivated, for example, only the display region A is displayed.

The display image creation unit 13 allocates a plurality of regions according to a plurality of display regions displayed on the display screen 54 into one display image. The display image is a range in which the cursor displayed on the display screen 54 can be moved. As illustrated in FIG. 2, the display image creation unit 13, for example, sets a region in the display image corresponding to the display region A to a region a, sets a region in the display image corresponding to the display region B to a region b, and allocates the regions a and b into the display image. The regions a and b, for example, are arranged to be adjacent to each other in the display image. The regions a and b in the display image are referred to as a display image region.

Figure 3:
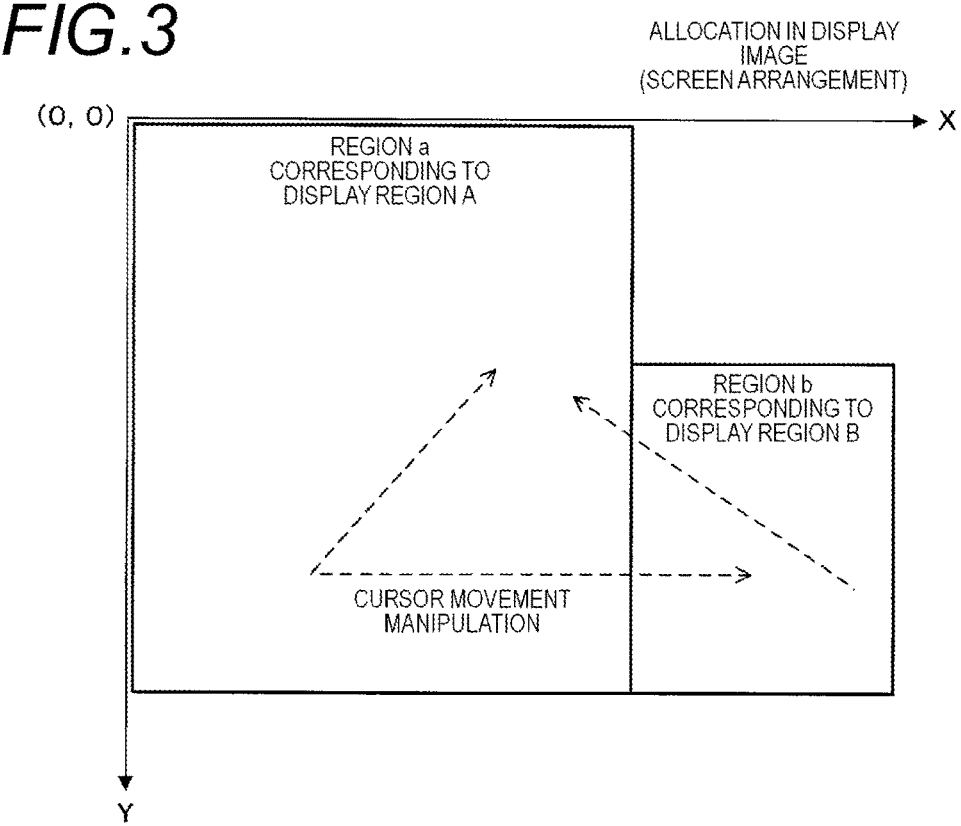
FIG. 3 is as schematic view illustrating an example of a display image created when an image creation device according to Embodiment 1 activates the PinP function.

FIG. 3 is a schematic view illustrating an example of the display image created when the image creation device according to Embodiment 1 activates the PinP function. As illustrated in FIG. 3, the display image is indicated by coordinates (X, Y). A left upper end of the region a (the display image region) in the display image corresponding to the display region A displayed on the display screen 54 is arranged on an origin (0, 0) of the display image region, and the region b (the display image region) in the display image corresponding to the display region B is arranged to be adjacent to a right side of the region a. In this case, as illustrated in FIG. 3, lower ends of the respective regions a and b may be arranged on the same line. Alternatively, when lower ends of the respective display regions A and B are not en the same line on the display screen 54, the lower ends of the respective regions a and b may not be on the same line in the display image.

When the user performs the movement manipulation of the cursor, a cursor position in the display image is moved according to the movement manipulation. Then, when the cursor position is in the region a, the cursor displayed on the display screen 54 is in a position corresponding to the display region A. In addition, when the cursor position is in the region b, the cursor displayed on the display screen 54 is in a position corresponding to the display region B. In the following description, the cursor indicates a cursor displayed on the display screen 54, and the cursor position indicates as cursor position in a display image work region.

The cursor movement, control unit 15 has a function as movement control means which controls a movement of the cursor position between one region a corresponding to the display region A and the other region b corresponding to the other display region B according to the received instruction for the superposed display.

Figure 4A:
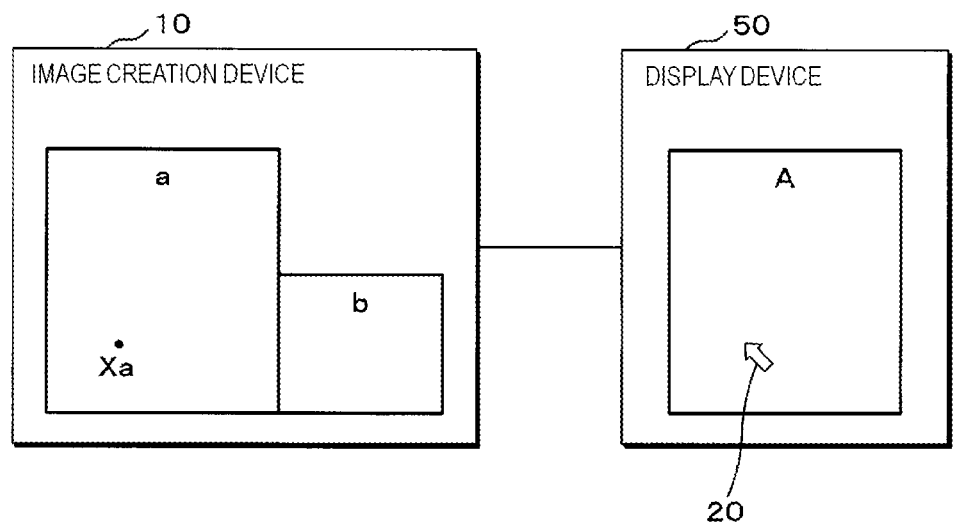
FIGS. 4A and 4B are schematic views illustrating an example of movement control of a cursor which is performed when the image creation device according to Embodiment 1 receives an instruction for as superposed display.
Figure 4B:
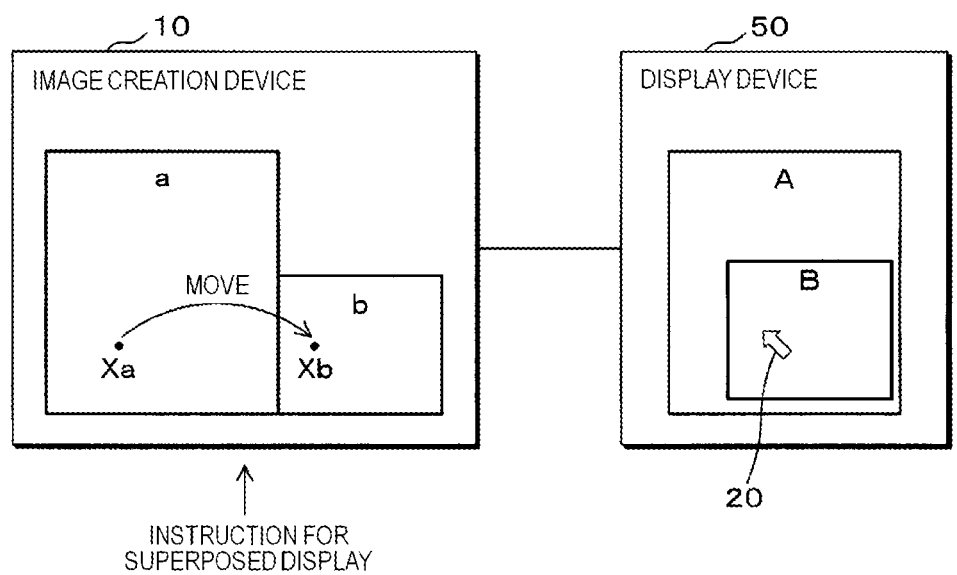

Next, an operation of the image display system 100 according to Embodiment 1 will be described. FIGS. 4A and 4B are schematic views illustrating an example of movement control of the cursor which is performed when the image creation device 10 according to Embodiment 1 receives the instruction for the superposed display. FIG. 4A illustrates a state before receiving an activating manipulation of the superposed display, and FIG. 4B illustrates a state after receiving the activating manipulation of the superposed display. As illustrated in FIG. 4A, in the state of before receiving the instruction for the superposed display, the image creation device 10 allocates the regions a and b respectively corresponding to the display regions A and B to be superposedly displayed on the display screen 54 into the display image.

In this case, the instruction for the superposed display is not received, and thus the display device 50 displays only the display region A on the display screen 54. In addition, the cursor position is in a position Xa in the region a, and a cursor 20 is displayed in a position on the display region A corresponding to the position Xa.

When the instruction for the superposed display is received, as illustrated in FIG. 4B, the cursor movement control unit 15 moves the cursor position from the position Xa in the region a to a position Xb in the region b. Accordingly, on the display screen 54, the cursor 20 is not concealed by the display region B, but appears in a position on the superposedly displayed display region B.

Thus, for example, when the instruction for the superposed display of the display region B on the display region A is received, the cursor position existing in the region a (the display image region) corresponding to the display region A is moved to the region b (the display image region) corresponding to the display region B. Accordingly, when the PinP function is realized, that is, when a plurality of screens is displayed on one display device, it is not necessary for a user to move the cursor between the display regions, and thus it is possible to improve the convenience of the user.

In addition, when the other display region B is superposed on the position of the cursor on the one display region A, that is, when the cursor on the display region A is concealed by the superposed display region B, the cursor movement control unit 15 moves the cursor position onto the other region b such that, the position of the cursor is not changed on the display screen 54. That is, when the display region B is superposedly displayed on the display region A, the cursor is displayed on the display region B without changing the position of the cursor at the time that the cursor on the display region A is in the position superposed on the display region B. Accordingly, for example, whenever the superposed display is performed, the user is able to save the labor of moving the cursor to the outside of the display region A to display the cursor on the display region B, and thus it is possible to improve the convenience of the user.

Figure 5A:
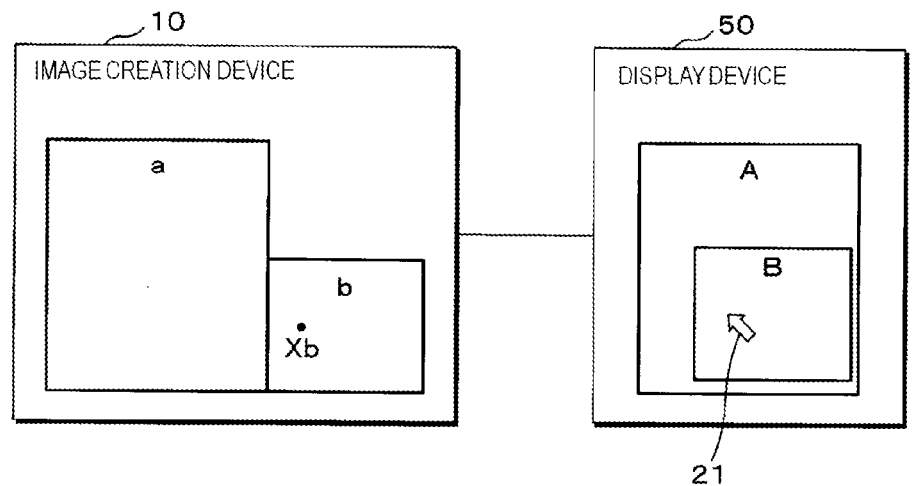
FIGS. 5A and 5B are schematic views illustrating an example of the movement control of the cursor which is performed when the image creation device according to Embodiment 1 receives an instruction for a non-superposed display.
Figure 5B:
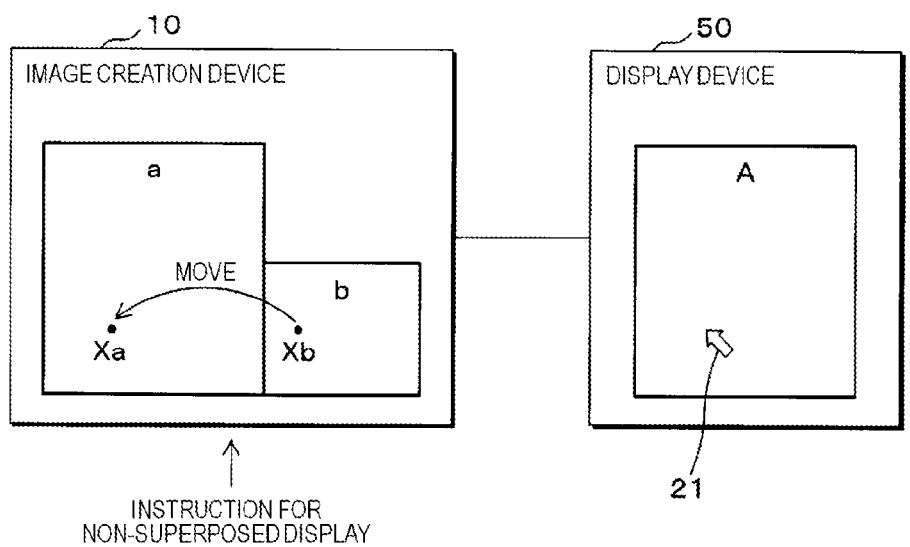

FIGS. 5A and 5B are schematic views illustrating an example of the movement control of the cursor which is performed when the image creation device 10 according to Embodiment 1 receives the instruction for the non-superposed display. FIG. 5A illustrates a state before receiving an inactivating manipulation of the superposed display, and FIG. 5B illustrates a state after receiving the inactivating manipulation of the superposed display. As illustrated in FIG. 5A, in the state before receiving the instruction for the non-superposed display during the superposed display, the display device 50, for example, superposedly displays the display region B on the display region A. In this case, for example, the cursor 21 is displayed on the position of the display region B corresponding to the cursor position Xb in the region b.

As illustrated in FIG. 5B, when the instruction for the non-superposed display is received, the cursor movement control unit 15 moves the cursor position from the position Xb in the region b to the position Xa in the region a. Accordingly, on the display screen 54, the cursor 21 appears in the position on the display region A without disappearing from the display screen 54.

Thus, when the display region B is superposedly displayed on the display region A, the cursor position existing on the region b (the display image region) corresponding to the display region B is moved onto the region a (the display image region) corresponding to the display region A at the time of receiving the instruction for the non-superposed display. Accordingly, when the PinP function is realized, that is, when a plurality of screens is displayed on one display device, it is not necessary for a user to move the cursor between the display regions, and thus it is possible to improve the convenience of the user. That is, whenever the non-superposed display is performed, the user is able to save the labor of moving the cursor to the outside of the display region B to display the cursor on the display region A, and thus it is possible, to improve the convenience of the user.

In addition, the cursor movement control unit 15 moves the cursor position from the region b onto the region a such that the position of the cursor is not changed on the display screen 54. That is, when the non-superposed display is performed while the display region B is superposedly displayed on the display region A, the cursor is displayed on the display region A without changing the position of the cursor on the display region B. Accordingly, for example, whenever the non-superposed display is performed, the user is able to save the labor of moving the cursor to the outside of the display region B to display the cursor on the display region A, and thus it is possible to improve the convenience of the user.

Furthermore, the movement of the cursor position may be in any position in the region a or in the region b. FIGS. 6A and 6B are schematic views illustrating an example of the movement of the cursor by the image creation device according to Embodiment 1.

FIG. 6A illustrates an example in which the position of the cursor is not changed. As illustrated in FIG. 6A, before the superposed display, when only the display region A is displayed, a cursor 22 is displayed on the display region A. When the instruction for the superposed display is received and the display region B is superposedly displayed on the display region A, the cursor 22 is displayed on the display region B without changing a position of the cursor 22. Then, when the instruction for the non-superposed display is further received, the cursor 22 is displayed on the display region A without changing the position of the cursor 22.

FIG. 6B illustrates an example in which the cursor is displayed in the center of the display region. As illustrated in FIG. 6B, before the superposed display, when only the display region A is displayed, a cursor 23 is displayed on the display region A. When the instruction for the superposed display is received and the display region B is superposedly displayed on the display region A, the cursor 23 is displayed by being moved to the center of the display region B. Then, when the instruction for the non-superposed display is further received, the cursor 23 is displayed by being moved to the center of the display region A.

Accordingly, for example, whenever the superposed display is performed, the user is able to save the labor of moving the cursor to the outside of the display region A to display the cursor on the display region B, and thus it is possible to improve the convenience of the user.

Figure 7:
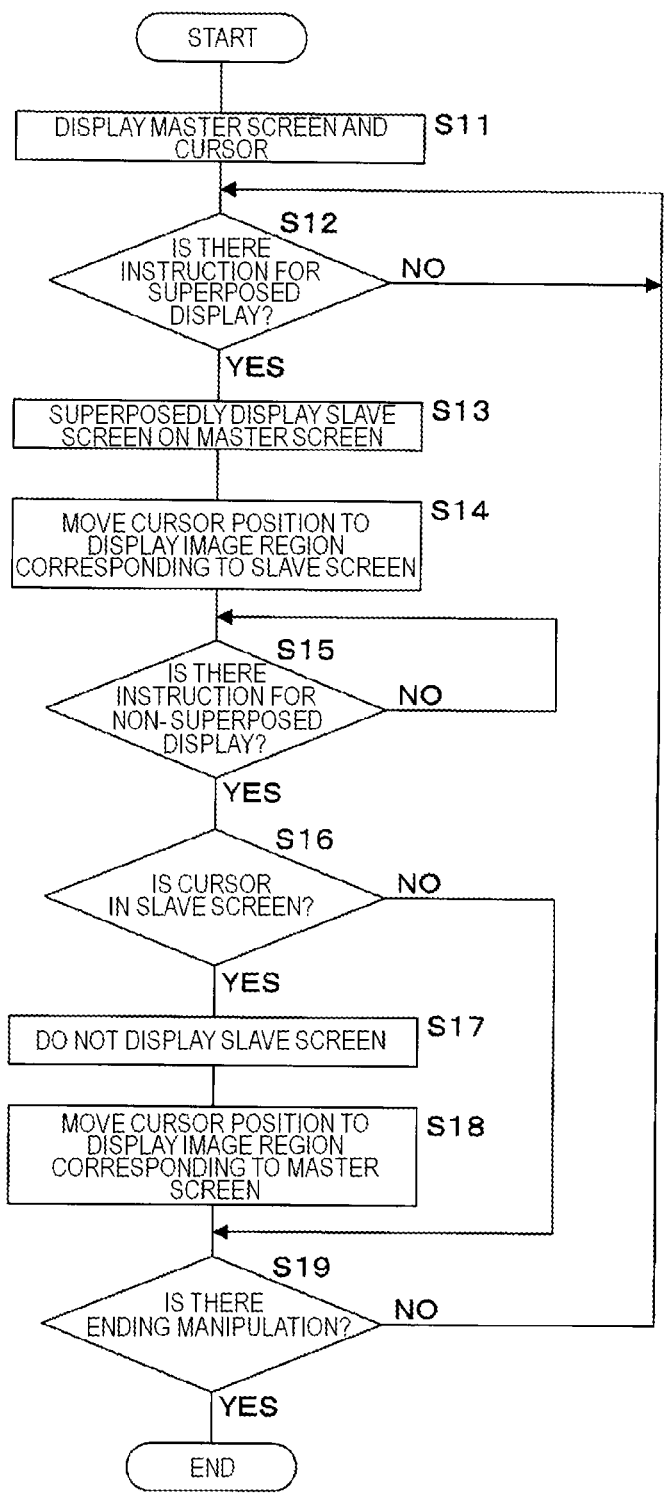
FIG. 7 is a flowchart illustrating an example of a process procedure of the image creation device according to Embodiment 1.

FIG. 7 is a flowchart illustrating an example of a process procedure of the image creation device 10 according to Embodiment 1. The process illustrated in FIG. 7 can be also realized by recording a computer program indicating the process procedure in a recording medium, by reading the computer program recorded in the recording medium with a recording medium reading device provided in a computer including a CPU, a RAM, or the like, by loading the read computer program in the RAM, and by executing the program in the CPU. Hereinafter, an example in which the control unit 11 is as processing subject will be described. In addition, the display region A which is superposedly displayed is referred to as a master screen, and the display region B which is superposedly displayed is referred to as a slave screen.

The control unit 11 displays the master screen and the cursor on the display screen 54 of the display device 50 (S11), determines whether or not there is the instruction for the superposed display (S12). When there is no instruction for the superposed display (NO in S12), the control unit 11 continues the process of Step S12.

When there is the instruction for the superposed display (YES in S12), the control unit 11 instructs the control unit 51 in the display device 50 to superposedly display the slave screen on the master screen (S13), and moves the cursor position from the display image region corresponding to the master screen to the display image region corresponding to the slave screen (S14).

The control unit 11 determines whether or not there is the instruction for the non-superposed display (S15). When there is no instruction for the non-superposed display (NO in S15), the control unit 11 continues the process of Step S15. When there is the instruction for the non-superposed display (YES in S15), the control unit 11 determines whether or not the cursor is in the slave screen (S16).

When the cursor is in the slave screen (YES in S16), the control unit 11 instructs the control unit 51 in the display device 50 not to display the slave screen (S17), and moves the cursor position from the display image region corresponding to the slave screen to the display image region corresponding to the master screen (S18). When the cursor is not in the slave screen (NO in S16), the control unit 11 performs a process of Step S19 described later without performing the processes of Steps S17 and S18.

The control unit 11 determines whether or not there is an ending manipulation (S19). The control unit 11 performs the processes after Step S12 when there is no ending manipulation (NO in S19), while finishing the process when there is the ending manipulation (YES in S19).

When the input unit 12 is disposed in the display device 50, the determination in Steps S12, S15, and S19 can be performed by the control unit 51, and the control unit 51 can transmit a determination result to the control unit 11 in the image creation device 10. In addition, in order not to change the position on the display image to which the cursor can be moved in Step S18, for example, the position of the cursor as illustrated in FIG. 6A, it is necessary to obtain arrangement information of the other display region B with respect to the one display region A by acquiring the information from the display device 50. A method for obtaining the cursor position from the arrangement information will be described by using embodiments described later. In addition, in order to display the cursor on the center of the display region as illustrated in FIG. 6B, the center position of the display region may be obtained with respect to each of the display image regions a and b in advance. In addition, the cursor position is not limited to the center position, but can be set to other fixed positions.

Embodiment 2

In Embodiment 1, the cursor position is moved according to activation or inactivation of the PinP function, that is, according to whether or not the display region is superposedly displayed. In Embodiment 2, movement control of the cursor in as state where the display region B (the slave screen) is superposedly displayed on the display region A (the master screen) is described. Configurations of the image creation device 10 and the display device 50 are identical to those of Embodiment 1, and several functions are added. Hereinafter, the added functions will be described.

The control unit 11 has a function as specification means which specifies boundary information indicating a boundary between the display regions A and B at the time of superposing the other display region B on the one display region A in the display image. When the display region B is displayed on the display screen 54 by being superposed on the display region A, the boundary information, for example, can be indicated by horizontal and vertical line segments for defining the display region B or the region a at the time of superposing the display region B on the region as (the display image region) corresponding to the display region A similar to the display screen 54.

In addition, the control unit 11 has a function as determination means which determines whether or not the cursor position which is moved according to the movement manipulation of the cursor by the user exceeds the boundary on the region a. For example, the control unit 11 determines whether or not the cursor position in the region a is moved to exceed the boundary with the display region B. Otherwise, the control unit 11 determines whether or not the cursor position in the display region B is moved to exceed the boundary with the region a.

In addition, the control unit 11 has a function as creation means which creates movement information of the cursor position between the one region a (the display image region) and the other region b (the display image region) based on position information of the cursor position. When the position in the display image is indicated by the (x, y) coordinates, the movement information, for example, can be indicated by a movement distance on the x coordinate, and by a movement distance on the y coordinate distance.

For example, when the cursor position in the region a is moved to exceed the boundary with the display region B, the control unit 11 creates the movement information for moving the cursor from the position in the region a to the position in the region b corresponding to the display region B. In addition, when the cursor position in the region b is moved to exceed the boundary with the display region A, the control unit 11 creates the movement information for moving the cursor from the position in the region b to the position in the region a corresponding to the display region A.

The cursor movement control unit 15 moves the cursor position between the region a corresponding to the display region A and the region b corresponding to the display region B based on the created movement information. For example, when the cursor reaches the boundary between the display region A and the display region B, the cursor movement control unit 15 moves the cursor position between the region a and the region b.

Figure 8A:
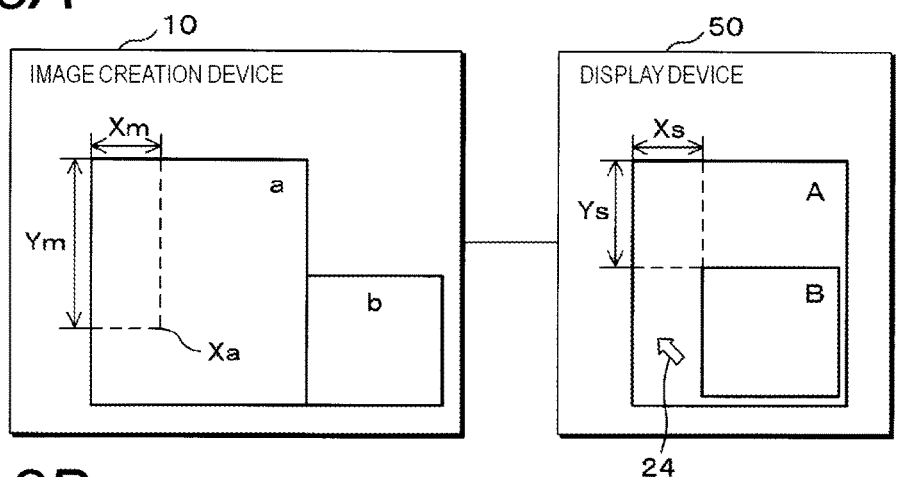
FIGS. 8A to 8C are schematic views illustrating an example of the movement control of the cursor which is performed by an image creation device according to Embodiment 2 during the superposed display.
Figure 8B:
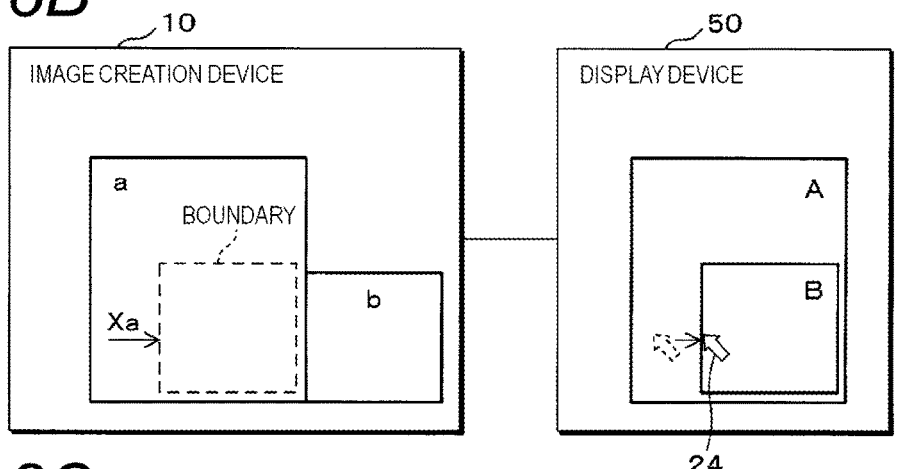
Figure 8C:
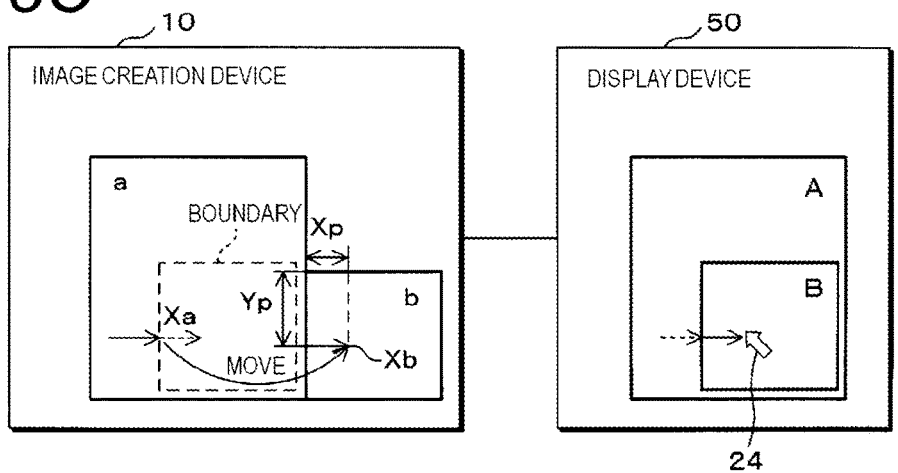

FIGS. 8A to 8C are schematic views illustrating an example of the movement control of the cursor which is performed by the image creation device 10 according to Embodiment 2 during the superposed display. As illustrated in FIGS. 8A to 8C, the display device 50 superposedly displays the display region B on the display region A. The image creation device 10 creates the region a corresponding to the display region A and the region b corresponding to the display region B in the display image, respectively.

As illustrated in FIG. 8A, when the left upper end of the display region A is set to the origin (0, 0) of the coordinates, coordinates (a position) of a left, upper end of the display region B can be indicated by coordinates (Xs, Ys). The coordinates (Xs, Ys) can be used as the arrangement information of the display region B with respect to the display region A. In addition, coordinates of the cursor position Xa in the region a can be indicated by (Xm, Ym). Then, a cursor 24 is displayed on the position of the display region A corresponding to the cursor position Xa (Xm, Ym).

As illustrated in FIG. 8A, the cursor position (Xm, Ym) is moved in the region a, and the cursor 24 on the display region A is also moved according to the movement manipulation of the cursor.

Then, as illustrated in FIG. 8B, when the cursor position Xa reaches the boundary indicated by a broken line in the region a, the cursor 24 on the display screen 54 of the display device 50 reaches the boundary between the display region A and the display region B. At this time, the cursor movement control unit 15 moves the cursor position Xa in the region a to the position Xb in the region b.

Then, as illustrated in FIG. 8C, the cursor position Xb (Xp, Yp) is moved in the region b, and the cursor 24 on the display region B is also moved according to the movement manipulation of the cursor.

Accordingly, when the PinP function is realized, that is, when a plurality of screens is displayed on the one display device, the cursor can be smoothly moved between the display regions superposedly displayed on the display screen (a seamless movement can be realized). Thus it is possible to prevent a problem in which the movement of the cursor is different from an appearance such as a phenomenon where the cursor disappears from the boundary between the superposed display regions, or a phenomenon where the cursor suddenly appears from an end of the display region.

Figure 9:
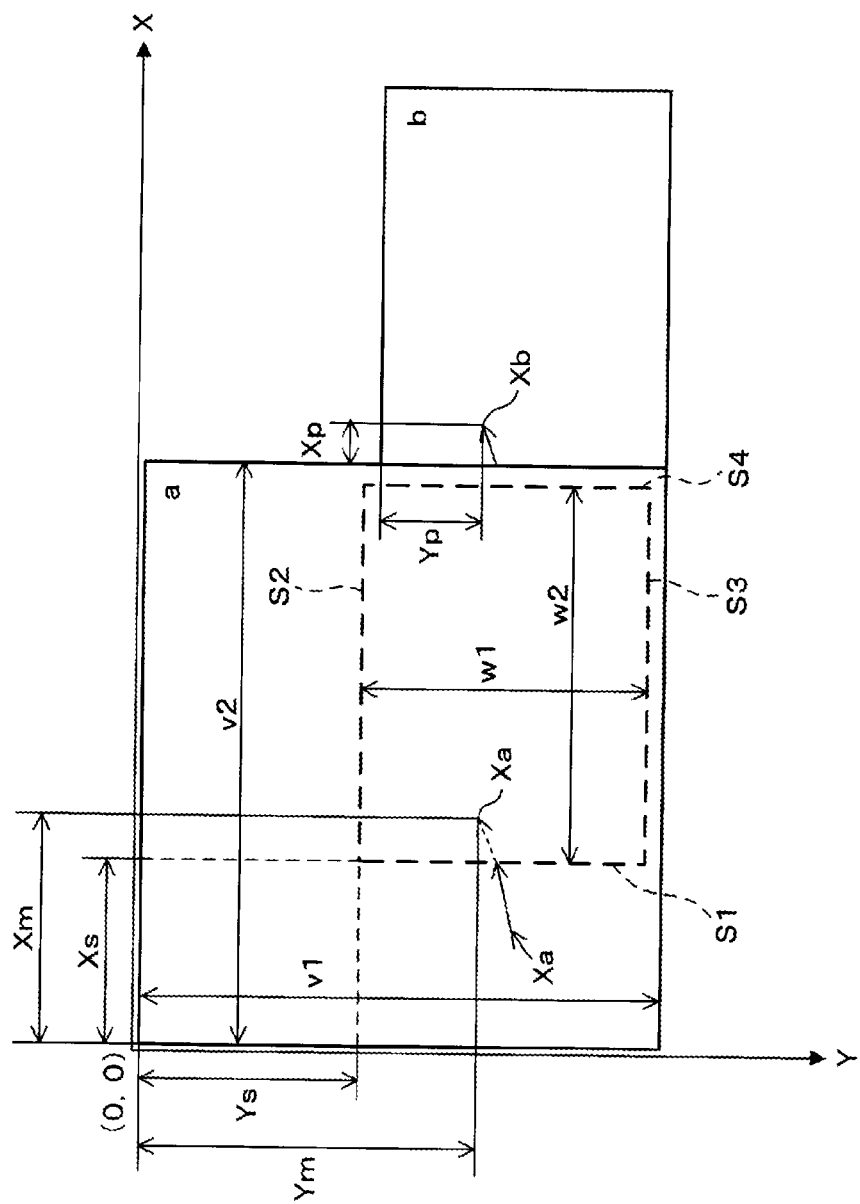
FIG. 9 is an explanatory diagram illustrating an aspect of the movement of the position of the cursor in the display image created by the image creation device.

Next, a method for specifying the boundary information, and a method for creating the movement information of the cursor will be described. FIG. 9 is an explanatory diagram illustrating an aspect of the movement of the position of the cursor in the display image created by the image creation device 10. A horizontal size and a vertical size of the region a corresponding to the display region A are set to v1 and v2, respectively, and a horizontal size and a vertical size of the display region B are set to w1 and w2, respectively. En addition, the cursor position in the region a is indicated by Xa, and the cursor position in the region b is indicated by Xb.

The interface unit 14 of the image creation device 10 acquires the arrangement information of the other display region B with respect to the one display region A from the display device 50. When the display region B superposedly displayed on the display region A on the display screen 54, the display device 50 retains the arrangement information on how the display region B is superposed. As illustrated in FIG. 8A, the arrangement information, for example, is information indicating where an origin of the display region B is in the position or the coordinates of the display region A with respect to the position or the coordinates (0, 0) of the origin (for example the left upper end of the display region A) of the display region A, and for example, can be indicated by the coordinates (Xs, Ys).

The control unit 11 can determine a timing of smoothly moving the cursor between the display regions superposedly displayed on the display screen. For example, in an example illustrated in FIG. 9, the timing is determined by a magnitude relationship (specifically, Xs<Xm<Xs+w2, and Ys<Ym<Ys+w1) between the coordinates Xa (Xm, Ym) of the cursor, and start coordinates (Xs, Ys) and end coordinates (Xs+w2, Ys+w1) of the superposed display region B.

In addition, the control unit 11 creates the movement information of the cursor position based on the acquired arrangement information and the position information of the cursor position. For example, as illustrated in FIG. 9, when the display region B is superposed on the display region A, the horizontal size and the vertical size of the region a corresponding to the display region A are set to v1 and v2, respectively, and the horizontal size and the vertical size of the display region B are set to w1 and w2, respectively. In addition, when the coordinates of the cursor position Xa in the region a (the display image region) corresponding to the display region A are set to (Xm, Ym), the coordinates of the cursor position Xb in the region b at the time that the cursor exceeds the boundary of the region a corresponding t) the display region A are able to be indicated by (Xp+v2, Yp+v1−w1). Here, Xp=Xm−Xs, and Yp=Ym−Ys.

Accordingly, when the PinP function is realized, that is, when a plurality of screens is displayed on the one display device, the cursor can be smoothly moved between the display regions superposedly displayed on the display screen (a seamless movement can be realized). Thus it is possible to prevent a problem in which the movement of the cursor is different from an appearance such as a phenomenon where the cursor disappears from the boundary between the superposed display regions, or a phenomenon where the cursor suddenly appears from an end of the display region.

Figure 10:
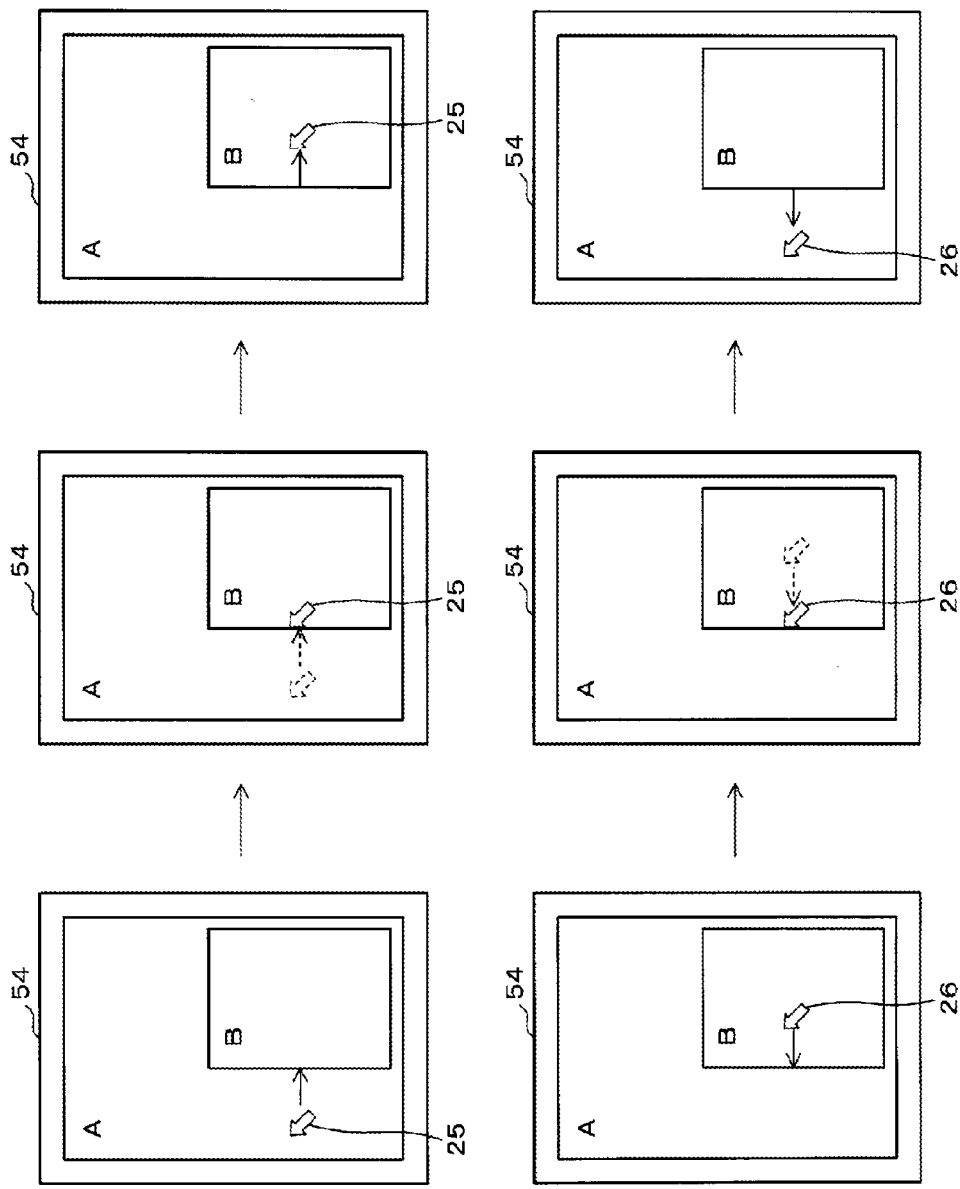
FIGS. 10A and 10B are schematic views illustrating an example of the movement of the cursor by the image creation device according to Embodiment 2.

FIGS. 10A and 100B are schematic views illustrating an example of the movement of the cursor by the image creation device 10 according to Embodiment 2. As illustrated in FIG. 10A, when the display region B (the slave screen) is superposedly displayed on the display region A (the master screen) on the display screen 54, a cursor 25 is moved in the display region A, and reaches the boundary between the display region A and the display region B. At this time, the cursor position in the display image is moved from the region a to the region b, and thus the cursor 25 is continuously moved on the display region B to be displayed without disappearing from the display region B.

In addition, as illustrated in FIG. 10B, when the display region B (the slave screen) is superposedly displayed on the display region A (the master screen) on the display screen 54, a cursor 26 is moved in the display region B, and reaches the boundary between the display region A and the display region B. At this time, the cursor position in the display image is moved from the region b to the region a, and the cursor 26 is continuously moved on the display region A to be displayed without suddenly appearing from a right end of the display region A.

Figure 11:
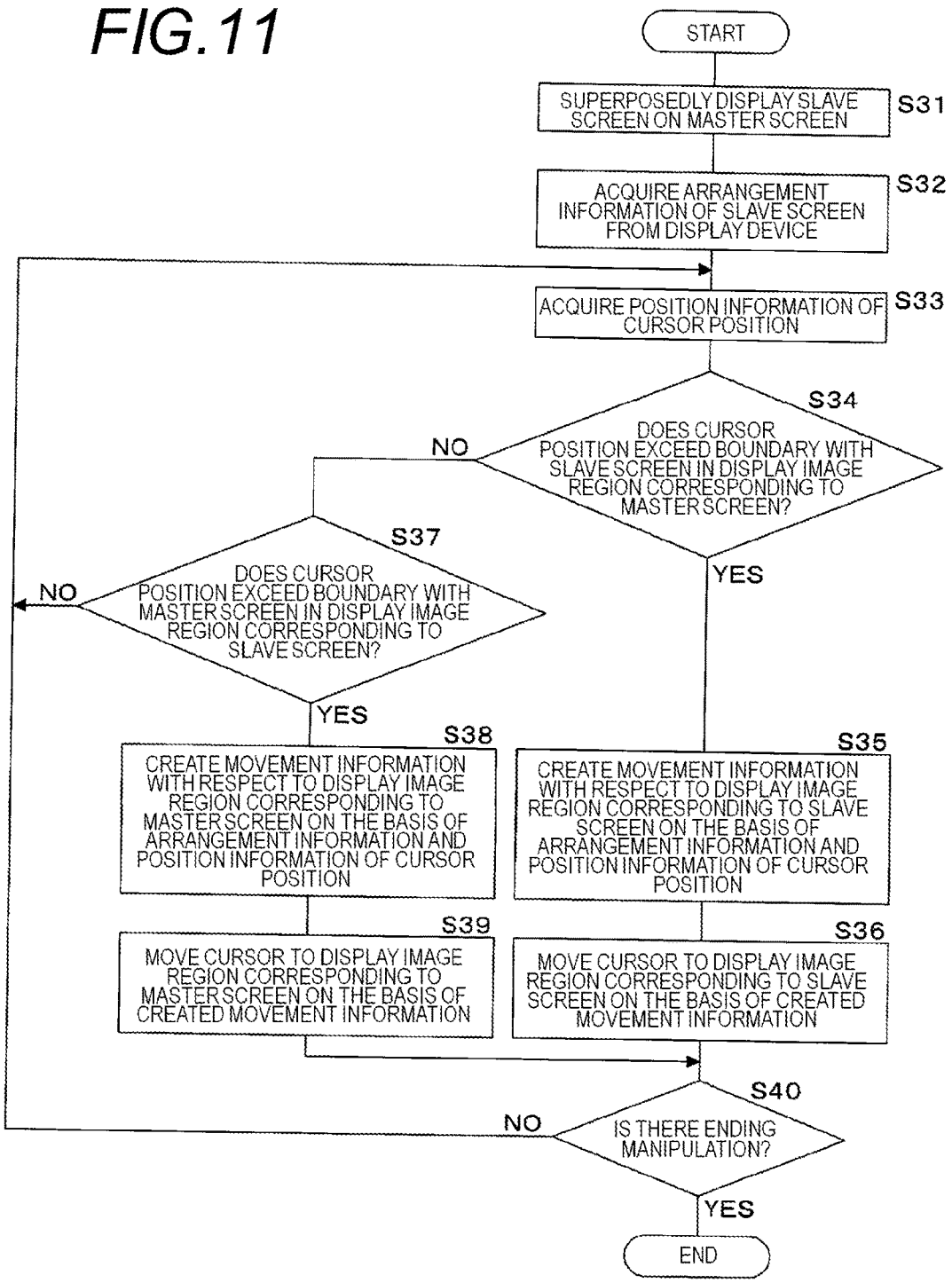
FIG. 11 is a flowchart illustrating an example of a process procedure of the image creation device according to Embodiment 2.
Figure 12:
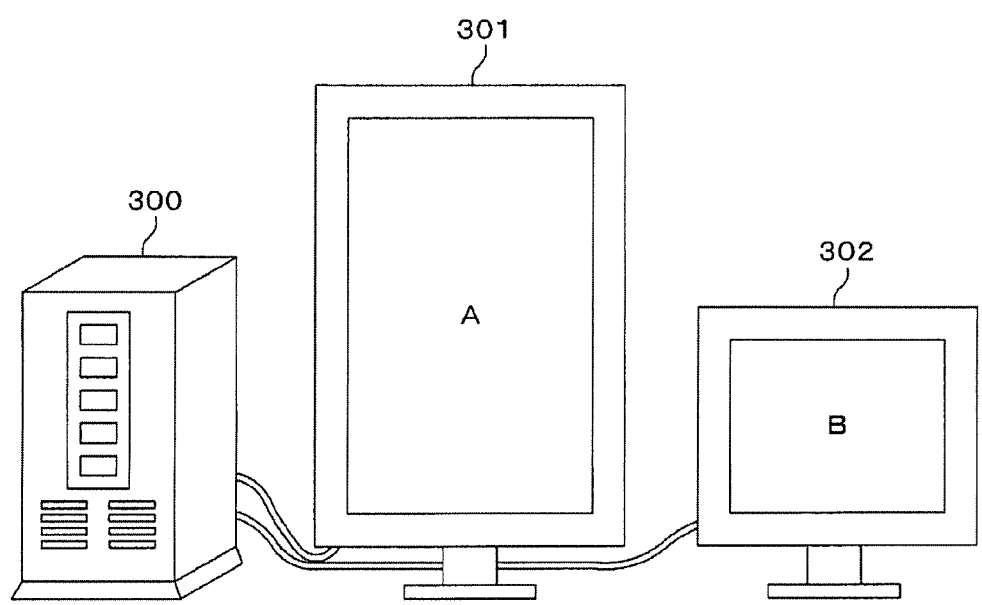
FIG. 12 is a schematic view illustrating an example of a configuration of an image display system of the related art.

FIG. 11 is a flowchart illustrating an example of a process procedure of the image creation device 10 according to Embodiment 2. The process illustrated in FIG. 11 can be also realized by recording a computer program indicating the process procedure in a recording medium, by reading the computer program recorded in the recording medium with a recording medium reading device provided in a computer including a CPU, a RAM, or the like, by loading the read computer program in the RAM, and by executing the program in the CPU. Hereinafter, an example in which the control unit 11 is a processing subject will be described. In addition, the display region A which is superposedly displayed is referred to as a master screen, and the display region B which is superposedly displayed is referred to as a slave screen.

The control unit 11 instructs the control unit 51 in the display device 50 to superposedly display the slave screen on the master screen (S31), and acquires the arrangement information of the slave screen from the display device 50

(S32). The control unit 11 acquires the position information of the cursor position (S33), and determines whether or not the cursor position exceeds the boundary with the slave screen in the display image region (the region a) corresponding to the master screen (S34). Whether or not the cursor position exceeds the boundary, for example, can be determined by whether or not the cursor position is in a region surrounded by line segments S1 to S4 in FIG. 9.

When the cursor position exceeds the boundary with the slave screen in the display image region corresponding to the master screen (YES in S34), the control unit 11 creates the movement information with respect to the display image region (the region b) corresponding to the slave screen based on the arrangement information and the position information of the cursor position (S35), and moves the cursor position to the display image region (the region b) corresponding to the slave screen based on the created movement information (S36).

When the cursor position does not exceed the boundary with the slave screen in the display image region corresponding to the master screen (NO in S34), the control unit 11 determines whether or not the cursor position exceeds the boundary with the master screen in the display image region (the region b) corresponding to the slave screen (S37). Whether or not the cursor position exceeds the boundary, for example, can be determined by whether or not the cursor position is moved to the outside of the region b in FIG. 9.

When the cursor position exceeds the boundary with the master screen in the display image region corresponding to the slave screen (YES in S37), the control unit 11 creates the movement information with respect to the display image region (the region a) corresponding to the master screen based on the arrangement information and the position information of the cursor position (S38), and moves the cursor position to the display image region (the region a) corresponding to the master screen based on the created movement information (S39).

When the cursor position does not exceed the boundary with the master screen in the display image region corresponding to the slave screen (NO in S37), the control unit 11 repeats the processes after Step S33. The control unit 11 determines whether or not there is the ending manipulation (S40). The control unit 11 performs processes after Step S33 when there is no ending manipulation (NO in S40), while finishing the process when there is the ending manipulation (YES in S40).

In Embodiment 2 described above, the slave screen (the display region B) can be usually set to the non-display, and the slave screen (the display region B) can be superposedly displayed at the time that the cursor position exceeds the boundary with the display region B on the display image region (the region a). In addition, the slave screen (the display region B) may be superposedly displayed on the master screen (the display region A), and the slave screen may be set to the non-display at a timing when the cursor position is moved to the outside of the display image region (the region b) corresponding to the slave screen. In this case, determination information of Steps S34 and S37 is transmitted to the control unit 51 in the display device 50, and thus activation or inactivation of the superposed display is performed.

In addition, any one of or both the display image regions a and b corresponding to the display regions A and B may be enlarged or reduced in the display device 50. In this case, the arrangement information is acquired from the display device 50 by adding an enlargement factor or a reduction factor to the arrangement information described above, and the arrangement information is added to coordinate information used in the determination of Steps S34 and S37, and thus it is possible to realize the seamless movement of the cursor.

In the examples described above, the PinP display is described as a premise, but the present invention is not limited thereto, and the picture-by-picture (PbyP) display which displays two or more display regions in parallel may be performed. In particular, when the display regions are displayed on the display device 50 to have an alignment (for example, up and down) different from an alignment (for example, right and left) of the display image regions a and b, according to the present invention, it is possible to realize the cursor movement without making the user confused.

REFERENCE SIGNS LIST

11, 51: control unit
12: input unit
13: display image creation unit
14, 52: interface unit
15: cursor movement control unit
53: superposed display control unit
54: display screen

The invention claimed is:

1. A cursor movement control method performed by a cursor movement control device which controls a movement of a cursor position in a coordinate space of a display image region, wherein the display image region includes a plurality of regions to be allocated into a plurality of display regions displayed on one display screen of an image display device by a PinP display function, the cursor movement control method comprising:

a reception step of receiving an instruction of activation or inactivation of the PinP display function for a simultaneous display or a non-simultaneous display of one display region and another display region on the one display screen; and a control step of controlling the movement of the cursor position in the coordinate space of the display image region where one region and another region are arranged to be adjacent to each other, wherein the cursor position is moved in the coordinate space from and to the one region corresponding to the one display region and from and to the other region corresponding to the other display region according to the instruction of activation or inactivation of the PinP display function received in the reception step such that when the instruction for superposed display is received the cursor position will automatically move without input from a user from a position in the one region and to a position in the other region, and further in the control step:

the cursor position on the one region is moved onto the other region when the instruction for the simultaneous display is received in the reception step, such that the cursor displayed on the display screen appears in a position on the other display region which is superposedly displayed on the one display region, and while the one display region and the other display region are simultaneously displayed on the display screen, the cursor position on the other region is moved onto the one region when the instruction for the non-simultaneous display is received in the reception step, such that the cursor displayed on the display screen appears in a position on the one display region without disappearing from the display screen, wherein the display regions displayed on the one display screen and regions in the coordinate space are different from each other, and the display regions are included in an actual screen of a computing device and the regions in the coordinate space are virtual in the computing device, and an operating system of the computing device recognizes that the one region and the other region in the coordinate space are arranged to be adjacent to each other, a position of a cursor displayed on the display screen is controlled according to the cursor position in the coordinate space.

2. The cursor movement control method according to claim 1, wherein
in the control step, the cursor position on the one region is moved onto the other region in the coordinate space when the instruction for the display is received in the reception step.

3. The cursor movement control method according to claim 2, wherein
in the control step, the cursor position is moved onto the other region in the coordinate space such that the position of the cursor on the display screen is not changed when the cursor on the one display region is in a superposed position on the other display region.

4. The cursor movement control method according to claim 1, wherein
in the control step, while the one display region and the other display region are simultaneously displayed on the display screen, the cursor position on the other region is moved onto the one region in the coordinate space when the instruction for the non-display is received in the reception step.

5. The cursor movement control method according to claim 4, wherein
in the control step, the cursor position is moved onto the one region in the coordinate space such that the position of the cursor on the display screen is not changed.

6. A cursor movement control method performed by a cursor movement control device which controls a movement of a cursor position in a coordinate space of a display image region, wherein the display image region includes a plurality of regions to be allocated into a plurality of display regions displayed on a display screen of an image display device by a PinP display function, the cursor movement control method comprising:

a specification step of specifying, in the coordinate space of the display image region, boundary information indicating a boundary between one display region and the other display region for a case where the one display region and the other display region are simultaneously displayed on the display screen in an activated state of the PinP display function;

a reception step of receiving a movement manipulation of a cursor;

a determination step of determining whether or not the cursor position in the coordinate space according to the movement manipulation received in the reception step exceeds the boundary;

a creation step of creating movement information of the cursor position in the coordinate space between one region and another region, which are arranged to be adjacent to each other, based on position information of the cursor position when it is determined that the cursor position exceeds the boundary in the determination step; and a control step of controlling the movement of the cursor position in the coordinate space, wherein the cursor position is moved from and to the one region and the other region based on the movement information created in the creation step, such that when the cursor position reaches the boundary between the one region and the other region, the control step moves the cursor position between the display regions which are superposedly displayed on the display screen and the cursor will not disappear between the superposed display regions, wherein the display regions displayed on the display screen and regions in the coordinate space are different from each other, and the display regions are included in an actual screen of a computing device and the regions in the coordinate space are virtual in the computing device, and an operating system of the computing device recognizes that the one region and the another region in the coordinate space are arranged to be adjacent to each other, and a cursor displayed on the display screen is controlled according to the cursor position in the coordinate space.

7. The cursor movement control method according to claim 6, further comprising:
an acquisition step of acquiring arrangement information of the other display region simultaneously displayed with the one display region from the image display device, wherein
in the creation step, the movement information of the cursor position in the coordinate space is created based on the arrangement information acquired in the acquisition step and the position information of the cursor position in the coordinate space.

8. A cursor movement control device which controls a movement of a cursor position in a coordinate space of a display image region, wherein the display image region includes a plurality of regions to be allocated into a plurality of display regions displayed on one display screen of an image display device by a PinP display function, the cursor movement control device comprising:

instruction reception means for receiving an instruction of activation or inactivation of the PinP display function for a simultaneous display or a non-simultaneous display of one display region and another display region on the one display screen; and movement control means for controlling the movement of the cursor position in the coordinate space of the display image where one region and another region are arranged to be adjacent to each other, wherein the cursor position is moved in the coordinate space from and to the one region corresponding to the one display region to/from the other region corresponding to the other display region according to the instruction received in the reception means such that when the instruction for superposed display is received the cursor position will automatically move without input from a user from a position in the one region and to a position in the other region, wherein:

the cursor position on the one region is moved onto the other region when the instruction for the simultaneous display is received, such that the cursor displayed on the one display screen appears in a position on the other display region which is superposedly displayed on the one display region, and while the one display region and the other display region are simultaneously displayed on the display screen, the cursor position on the other region is moved onto the one region when the instruction for the non-simultaneous display is received, such that the cursor displayed on the display screen appears in a position on the one display region without disappearing from the display screen;

an operating system which recognizes that the one region and the another region in the coordinate space are arranged to be adjacent to each other; and control means for controlling a position of a cursor displayed on the display screen according to the cursor position in the coordinate space.

9. A cursor movement control device which controls a movement of a cursor position in a coordinate space of a display image region, wherein the display image region includes a plurality of regions to be allocated into a plurality of display regions displayed on a display screen of an image display device by a PinP display function, the cursor movement control device comprising:

specification means for specifying, in the display image, boundary information indicating a boundary between one display region and the other display region when the one display region and the other display region are simultaneously displayed on the display screen in an activated state of the PinP display function;

manipulation reception means for receiving a movement manipulation of a cursor;

determination means for determining whether or not the cursor position in the coordinate space according to the movement manipulation received in the reception means exceeds the boundary;

creation means for creating movement information of the cursor position in the coordinate space between one region and another region, which are arranged to be adjacent to each other, based on position information of the cursor position when it is determined that the cursor position exceeds the boundary in the determination means;

an operating system which recognizes that the one region and the another region in the coordinate space are arranged to be adjacent to each other; and movement control means for controlling the movement of the cursor position in the coordinate space wherein the cursor position is moved from and to the one region to/from the other region based on the movement information created in the creation means such that when the cursor position reaches the boundary between the one region and the other region, the movement control means moves the cursor position between the display regions which are superposedly displayed on the display screen and the cursor will not disappear between the superposed display regions; and control means for controlling a position of a cursor displayed on the display screen according to the cursor position in the coordinate space.

10. An image display system comprising:
the cursor movement control device according to claim 8; and
an image display device including a display screen on which a cursor is displayed by the cursor movement control device.

11. An image display system comprising:
the cursor movement control device according to claim 9; and
an image display device including a display screen on which a cursor is displayed by the cursor movement control device.

12. The cursor movement control device according to claim 8, wherein:
the plurality of display regions are set to display regions A and B,
in the display image, a region corresponding to the display region A is set to a region a and a region corresponding to the display region B is set to a region b,
the regions a and b are arranged in an order with respect to one another in the display image,
the instruction reception means receives an instruction for whether or not to simultaneously or non-simultaneously display the display region B and the display region A,
when the instruction for the simultaneous display of the display region A and the display region B is received, the cursor position existing in the region a corresponding to the display region A is moved to the region b corresponding to the display region B.

13. The cursor movement control device according to claim 12, wherein:
when the display region A and the display region B are simultaneously displayed, the cursor position existing in the region b corresponding to the display region B is moved to the region a corresponding to the display region A at the time of receiving the instruction for the non-simultaneous display.

14. The cursor movement control method according to claim 2, wherein:
the plurality of display regions are set to display regions A and B,
in the display image, a region corresponding to the display region A is set to a region a and a region corresponding to the display region B is set to a region b,
the regions a and b are arranged in an order with respect to one another in the display image,
in the reception step, receiving an instruction for whether or not to simultaneously or non-simultaneously display the display region B and the display region A, and
in the control step, when the instruction for the simultaneous display of the display region A and the display region B is received, the cursor position existing in the region a corresponding to the display region A is moved to the region b corresponding to the display region B.

15. The cursor movement control method according to claim 14, wherein:
when the cursor on the display region A is in a position superposed on the display region B, the cursor is displayed on the display region B without changing the position of the cursor, and
when the display region A and the display region B are simultaneously displayed, the cursor is displayed on the display region B without changing the position of the cursor at the time that the cursor on the display region A is in a position from which the display region B disappears.

16. The cursor movement control method according to claim 15, wherein:
when the display region A and the display region B are simultaneously displayed, the cursor position existing in the region b corresponding to the display region B is moved to the region a corresponding to the display region A at the time of receiving the instruction for the non-simultaneous display, and the movement of the cursor position is in any position in the region a corresponding to the display region A without changing the position of the cursor.

17. The cursor movement control method according to claim 16, wherein:

when the non-simultaneous display is performed while the display region A and the display region B are simultaneously displayed, the cursor is displayed on the display region A without changing the position of the cursor on the display region B.

18. The cursor movement control device according to claim 9, wherein:

the plurality of display regions are set to display regions A and B, in the display image, a region corresponding to the display region A is set to a region a and a region corresponding to the display region B is set to a region b, and when the display region A and the display region B are simultaneously displayed on the screen, the boundary information is indicated by horizontal and vertical line segments for defining the display region B on the region a at the time of simultaneously displaying the display region B on the region a corresponding to the display region A similar to the display screen.

19. The cursor movement control device according to claim 18 wherein:

when the cursor position in the region a is moved to exceed the boundary with the display region B, the movement information for moving the cursor position from the position in the region a to the position in the region b corresponding to the display region B is created, and when the cursor in the region b is moved to exceed the boundary with the display region A, the movement information for moving the cursor position from the position in the region b to the position in the region a corresponding to the display region A is created, and the movement control means moves the cursor position between the region a corresponding to the display region A and the region b corresponding to the display region B based on the created movement information.

20. A cursor movement control device which controls a movement of a cursor position in a coordinate space of a display image including a plurality of regions to be allocated into a plurality of display regions displayed on a display screen of an image display device by a PinP display function or a PbyP display function, the cursor movement control device comprising:

specification means for specifying, in the display image, boundary information indicating a boundary between one display region and the other display region when the one display region and the other display region are simultaneously displayed on the display screen in an activated state of the PinP display function or the PbyP display function;

manipulation reception means for receiving a movement manipulation of a cursor;

determination means for determining whether or not the cursor position in the coordinate space according to the movement manipulation received in the reception means exceeds the boundary;

creation means for creating movement information of the cursor position in the coordinate space between one region and another region, which are arranged to be adjacent to each other, based on position information of the cursor position when it is determined that the cursor position exceeds the boundary in the determination means; and movement control means for controlling the movement of the cursor position in the coordinate space between the one region and the other region based on the movement information created in the creation means, wherein:

the plurality of display regions are set to display regions A and B, in the display image, a region corresponding to the display region A is set to a region a and a region corresponding to the display region B is set to a region b, when the display region A and the display region B are simultaneously displayed on the screen, the boundary information is indicated by horizontal and vertical line segments for defining the display region B on the region a at the time of simultaneously displaying the display region B on the region a corresponding to the display region A similar to the display screen, when the display region A and the display region B are simultaneously displayed on the display screen, the image display device retains arrangement information on how the display region B is superposed, the arrangement information is information indicating where an origin of the display region B is in a position or coordinates of the display region A with respect to a position or the coordinates (0, 0) of an origin of the display region A, indicated by the coordinates (Xs, Ys), the creation means creates the movement information of the cursor based on the acquired arrangement information and the position information of the cursor such that when the display region A and the display region B are simultaneously displayed, a horizontal size and a vertical size of the region a corresponding to the display region A are set to v1 and v2, respectively, and a horizontal size and a vertical size of the display region B are set to w1 and w2, respectively, and when the position or the coordinates of the cursor in the region a corresponding to the display region A are set to Xm, Ym, the position or the coordinates of the cursor in the display image region at the time that the cursor exceeds the boundary of the region a corresponding to the display region A to be moved to the display region B are indicated by Xp+v2, Yp+v1−w1, wherein Xp=Xm−Xs and Yp=Ym−Vs.

* * * * *